United States Patent
Zhou et al.

(10) Patent No.: US 9,142,249 B1
(45) Date of Patent: Sep. 22, 2015

(54) DISK DRIVE USING TIMING LOOP CONTROL SIGNAL FOR VIBRATION COMPENSATION IN SERVO LOOP

(71) Applicant: Western Digital Technologies, Inc., Irvine, CA (US)

(72) Inventors: Jianguo Zhou, Foothill Ranch, CA (US); Guoxiao Guo, Irvine, CA (US); Donald Brunnett, Pleasanton, CA (US); Min Chen, San Jose, CA (US); Wei Guo, Fremont, CA (US); Jie Yu, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/099,886

(22) Filed: Dec. 6, 2013

(51) Int. Cl.
*G11B 5/02* (2006.01)
*G11B 19/247* (2006.01)
*G11B 5/012* (2006.01)
*G11B 5/596* (2006.01)
*G11B 19/04* (2006.01)

(52) U.S. Cl.
CPC .............. *G11B 19/247* (2013.01); *G11B 5/012* (2013.01); *G11B 5/59622* (2013.01); *G11B 19/042* (2013.01)

(58) Field of Classification Search
CPC ........... G11B 5/35; G11B 19/042; G11B 5/02
USPC ........................... 360/39, 51, 55, 73.01, 97.19
See application file for complete search history.

(56) References Cited

U.S. PATENT DOCUMENTS

| | | | |
|---|---|---|---|
| 5,245,599 A * | 9/1993 | Ishii et al. | 369/44.32 |
| 5,956,307 A * | 9/1999 | Koudo et al. | 369/47.43 |
| 6,014,283 A | 1/2000 | Codilian et al. | |
| 6,052,076 A | 4/2000 | Patton, III et al. | |
| 6,052,250 A | 4/2000 | Golowka et al. | |
| 6,067,206 A | 5/2000 | Hull et al. | |
| 6,078,453 A | 6/2000 | Dziallo et al. | |
| 6,091,564 A | 7/2000 | Codilian et al. | |
| 6,094,020 A | 7/2000 | Goretzki et al. | |
| 6,101,065 A | 8/2000 | Alfred et al. | |
| 6,104,153 A | 8/2000 | Codilian et al. | |
| 6,122,133 A | 9/2000 | Nazarian et al. | |
| 6,122,135 A | 9/2000 | Stich | |
| 6,141,175 A | 10/2000 | Nazarian et al. | |
| 6,160,368 A | 12/2000 | Plutowski | |
| 6,181,502 B1 | 1/2001 | Hussein et al. | |
| 6,195,222 B1 | 2/2001 | Heminger et al. | |
| 6,198,584 B1 | 3/2001 | Codilian et al. | |

(Continued)

OTHER PUBLICATIONS

Widrow, B., Glover, J., McCool, J., Kaunitz, J., Williams, C., Hearn, R., Zeidler, J., Eugene Dong, J., Goodlin, R., "Adaptive noise cancelling: Principles and applications," Proc. IEEE, vol. 63, No. 12, Dec. 1975, pp. 1692-1716.

(Continued)

*Primary Examiner* — Thomas Alunkal (57) ABSTRACT

A disk drive is disclosed comprising a timing loop configured to generate a clock synchronized to a rotation of a disk and a servo loop configured to control an actuator to actuate a head over the disk. A timing signal generated by the timing loop is filtered with a pre-compensation filter (PCF) comprising an inverse transfer function from a delta in a rotation velocity of the disk ($\Delta\omega$) due to a vibration affecting the disk drive to the timing signal, and the actuator is controlled to actuate the head over the disk based on an output of the PCF.

21 Claims, 5 Drawing Sheets

(56) References Cited

U.S. PATENT DOCUMENTS

| | | |
|---|---|---|
| 6,198,590 B1 | 3/2001 | Codilian et al. |
| 6,204,988 B1 | 3/2001 | Codilian et al. |
| 6,243,223 B1 | 6/2001 | Elliott et al. |
| 6,281,652 B1 | 8/2001 | Ryan et al. |
| 6,285,521 B1 | 9/2001 | Hussein |
| 6,292,320 B1 | 9/2001 | Mason et al. |
| 6,310,742 B1 | 10/2001 | Nazarian et al. |
| 6,320,718 B1 | 11/2001 | Bouwkamp et al. |
| 6,342,984 B1 | 1/2002 | Hussein et al. |
| 6,347,018 B1 | 2/2002 | Kadlec et al. |
| 6,369,972 B1 | 4/2002 | Codilian et al. |
| 6,369,974 B1 | 4/2002 | Asgari et al. |
| 6,462,896 B1 | 10/2002 | Codilian et al. |
| 6,476,996 B1 | 11/2002 | Ryan |
| 6,484,577 B1 | 11/2002 | Bennett |
| 6,493,169 B1 | 12/2002 | Ferris et al. |
| 6,496,324 B1 | 12/2002 | Golowka et al. |
| 6,498,698 B1 | 12/2002 | Golowka et al. |
| 6,507,450 B1 | 1/2003 | Elliott |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,580,579 B1 * | 6/2003 | Hsin et al. ............ 360/77.02 |
| 6,614,615 B1 | 9/2003 | Ju et al. |
| 6,614,618 B1 | 9/2003 | Sheh et al. |
| 6,636,377 B1 | 10/2003 | Yu et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,853,512 B2 | 2/2005 | Ozawa |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,950,271 B2 | 9/2005 | Inaji et al. |
| 6,950,273 B2 * | 9/2005 | Nakagawa et al. ....... 360/78.14 |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,158,329 B1 | 1/2007 | Ryan |
| 7,158,334 B2 | 1/2007 | Iwashiro |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,931 B2 | 9/2007 | Ehrlich |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,319,570 B2 | 1/2008 | Jia et al. |
| 7,330,019 B1 | 2/2008 | Bennett |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,388,728 B1 | 6/2008 | Chen et al. |
| 7,391,583 B1 | 6/2008 | Sheh et al. |

(56) References Cited

U.S. PATENT DOCUMENTS

| | | | |
|---|---|---|---|
| 7,391,584 B1 | 6/2008 | Sheh et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,561,365 B2 | 7/2009 | Noguchi et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,953 B1 | 9/2009 | Cerda et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,633,704 B2 | 12/2009 | Supino et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,796,353 B2 * | 9/2010 | Schabes et al. ............... 360/59 |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 8,760,796 B1 | 6/2014 | Lou et al. |
| 8,767,332 B1 | 7/2014 | Chahwan et al. |
| 8,767,343 B1 | 7/2014 | Helmick et al. |
| 8,767,354 B1 | 7/2014 | Ferris et al. |
| 8,773,787 B1 | 7/2014 | Beker |
| 8,779,574 B1 | 7/2014 | Agness et al. |
| 8,780,473 B1 | 7/2014 | Zhao et al. |

(56) References Cited

U.S. PATENT DOCUMENTS

| | | |
|---|---|---|
| 8,780,477 B1 | 7/2014 | Guo et al. |
| 8,780,479 B1 | 7/2014 | Helmick et al. |
| 8,780,489 B1 | 7/2014 | Gayaka et al. |
| 8,792,202 B1 | 7/2014 | Wan et al. |
| 8,797,664 B1 | 8/2014 | Guo et al. |
| 8,804,267 B2 | 8/2014 | Huang et al. |
| 8,824,081 B1 | 9/2014 | Guo et al. |
| 8,824,262 B1 | 9/2014 | Liu et al. |
| 8,896,955 B1 | 11/2014 | Chen et al. |
| 2002/0093754 A1* | 7/2002 | Zhang et al. ............. 360/77.04 |
| 2004/0213100 A1 | 10/2004 | Iwashiro |
| 2004/0246618 A1* | 12/2004 | Ehrlich ................. 360/77.02 |
| 2005/0088774 A1 | 4/2005 | Bahirat et al. |
| 2005/0096793 A1 | 5/2005 | Takeuchi |
| 2006/0176004 A1* | 8/2006 | Hosono et al. ............. 318/632 |
| 2006/0291087 A1 | 12/2006 | Suh et al. |
| 2006/0291101 A1 | 12/2006 | Takaishi |
| 2007/0064334 A1* | 3/2007 | Jia et al. ................. 360/77.02 |
| 2008/0174900 A1 | 7/2008 | Abrishamchian et al. |
| 2009/0116136 A1* | 5/2009 | Zhang ..................... 360/75 |
| 2009/0135516 A1 | 5/2009 | Takasaki et al. |
| 2010/0035085 A1 | 2/2010 | Jung et al. |
| 2010/0061007 A1 | 3/2010 | Matsushita et al. |
| 2010/0079906 A1 | 4/2010 | Wile et al. |
| 2012/0284493 A1 | 11/2012 | Lou et al. |
| 2013/0120870 A1 | 5/2013 | Zhou et al. |
| 2013/0148240 A1 | 6/2013 | Ferris et al. |

OTHER PUBLICATIONS

B. Widrow, D. Shur and S. Shaffer, "On Adaptive Inverse Control," Record of the Fifteenth Asilomar Conference on Circuits, Systems and Computers, pp. 185-189, Nov. 1981.

Google, "Delta Definition," pre-dating Dec. 6, 2013 by several years.

Young-Hoon Kim, et al., U.S. Appl. No. 13/862,320, filed Apr. 12, 2013, 20 pages.

* cited by examiner

DISK DRIVE USING TIMING LOOP CONTROL SIGNAL FOR VIBRATION COMPENSATION IN SERVO LOOP

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

Figure 1:
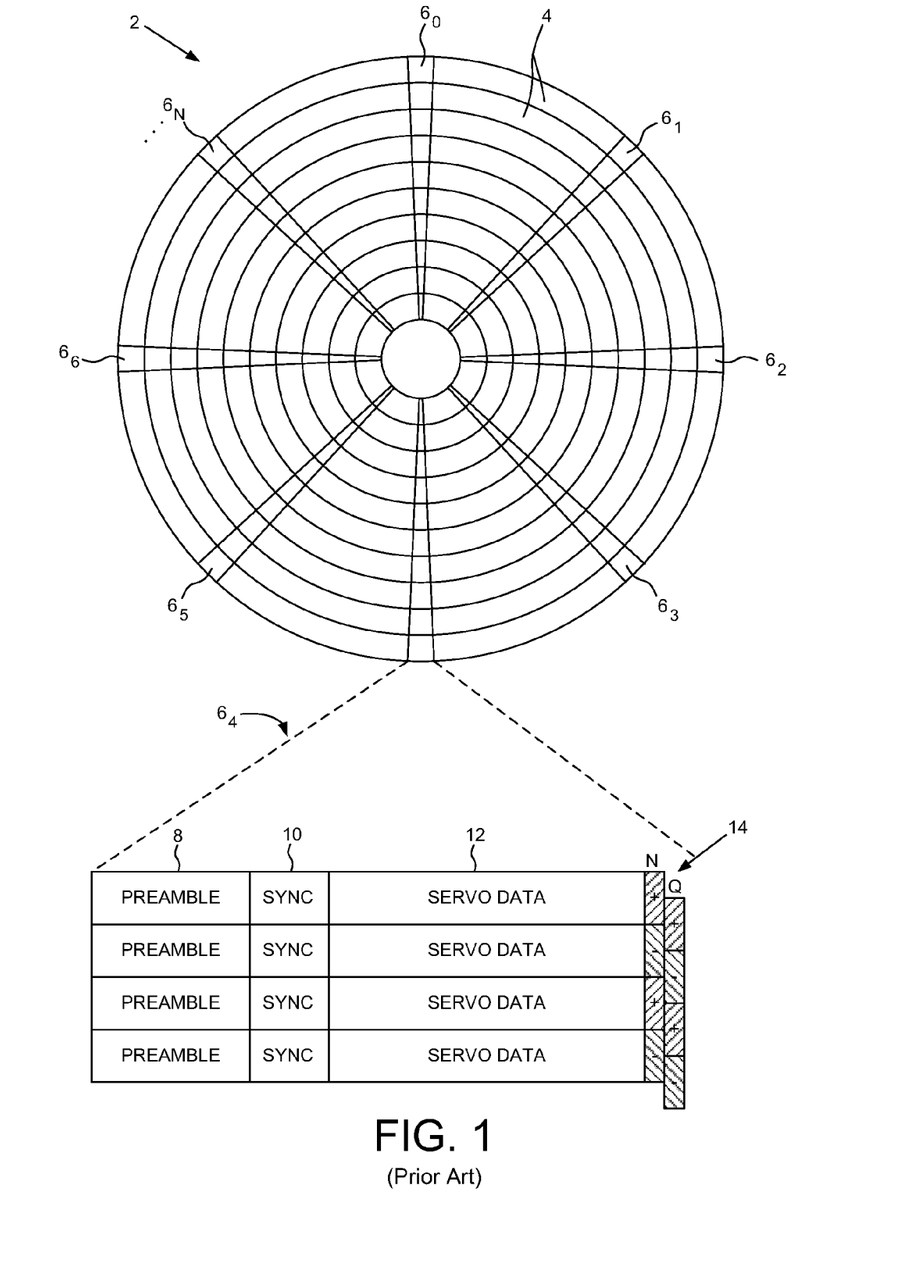
FIG. 1 shows a prior art disk format comprising a plurality of servo tracks defined by servo sectors.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figure 2A:
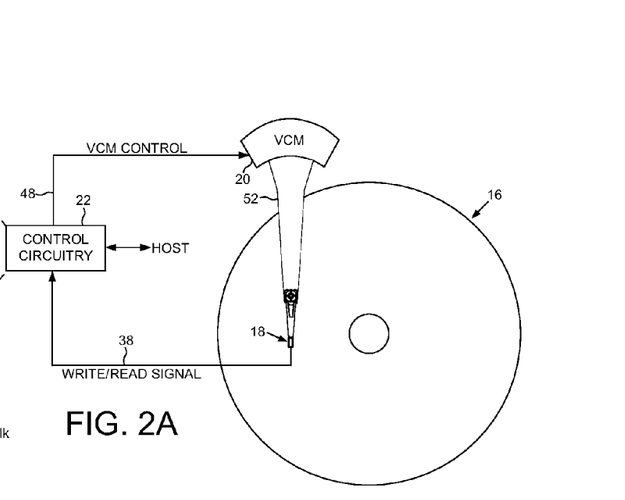
FIG. 2A shows a disk drive according to an embodiment comprising a head actuated over a disk by a servo loop controlling an actuator (e.g., VCM and/or microactuator).

FIG. 2A shows a disk drive according to an embodiment comprising a disk 16, a head 18, an actuator (e.g., VCM 20 and/or a microactuator), and control circuitry 22 comprising a timing loop 24 (FIG. 2B) configured to generate a clock 26 synchronized to a rotation of the disk 16 and a servo loop 28 configured to control the actuator to actuate the head 18 over the disk 16. The control circuitry 22 is configured to execute the flow diagram of FIG. 2C where a timing signal Xr 30 generated by the timing loop 24 is filtered with a pre-compensation filter (PCF) 32 comprising an inverse transfer function from a delta in a rotation velocity of the disk (Δω) due to a vibration affecting the disk drive to the timing signal Xr (block 34), and the actuator is controlled to actuate the head over the disk based on an output of the PCF (block 36).

Figure 2B:
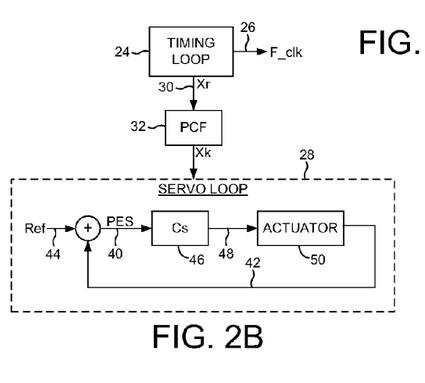
FIG. 2B shows a servo loop processing a timing signal from a timing loop in order to compensate for a vibration affecting the disk drive according to an embodiment.
Figure 2C:
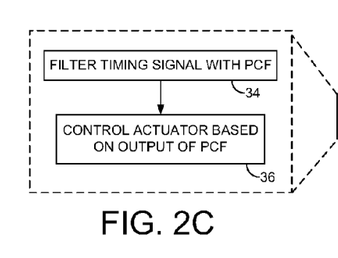
FIG. 2C is a flow diagram according to an embodiment wherein the timing signal is filtered with a pre-compensation filter (PCF) comprising an inverse transfer function from a delta in a rotation velocity of the disk (Δω) due to a vibration affecting the disk drive to the timing signal.

In one embodiment, the disk 16 of FIG. 2A may comprise any suitable servo data such as concentric servo sectors as shown in FIG. 1, or spiral servo tracks which may be processed, for example, to servo the head over the disk while writing concentric servo sectors to the disk. The control circuitry 22 may process a read signal 38 emanating from the head 18 to demodulate the servo data and generate a position error signal (PES) 40 representing an error between the actual position 42 of the head and a target position 44 relative to a target track (FIG. 2B). A suitable servo loop compensator 46 processes the PES 40 to generate a control signal 48 applied to the actuator 50 such as the VCM 20 which rotates an actuator arm 52 about a pivot in order to actuate the head 18 radially over the disk 16 in a direction that reduces the PES 40. In one embodiment, the actuator 50 shown in FIG. 2B may also comprise a suitable microactuator, such as a suitable piezoelectric (PZT) element for actuating the head 18 relative to a suspension, or for actuating a suspension relative to the actuator arm 52.

The timing loop 24 of FIG. 2B may generate the clock 26 synchronized to the rotation of the disk 16 in any suitable manner. In one embodiment, the timing loop 24 may generate the clock 26 by measuring a time interval between servo data written on the disk, such as a time interval between consecutive spiral servo track crossings or a time interval between consecutive concentric servo sectors. In another embodiment, the time interval may be measured relative to the bit transitions within the servo data. In one embodiment, the measured interval may be compared to a target interval in order to generate a timing error (phase error) for a phase-locked loop, where the timing error may be used to adjust a frequency of a frequency generator that generates the clock 26 synchronized to the rotation of the disk 16. Once the clock 26 is synchronized, it may be used for any suitable purpose, such as timing when to open a servo gate relative to the servo data written on the disk, timing when to servo write a concentric servo sector, and/or servo write a concentric servo sector at the correct frequency. In another embodiment, the clock 26 may be used to write/read data to data sectors in data tracks on the disk 16 during normal access operations, wherein during read operations the clock 26 may be synchronized when reading a preamble at the beginning of each data sector as well as synchronized when reading user data from a data sector.

The disk drive may be subjected to a vibration (external or internal) that may degrade the ability of the servo loop 28 to maintain the head 18 at a target radial location, for example, when servo writing the disk 16 or when accessing a data track. In one embodiment, a vibration affecting the disk drive may manifest in a timing signal Xr 30 of the timing loop 24. For example, a vibration affecting the disk drive (e.g., a rotational vibration) may affect the rotation velocity of the disk 16 and therefore affect a timing signal Xr 30 in the timing loop 24 such as the above-described timing error (phase error) between a measured interval and a target interval. Accordingly, in one embodiment a timing signal Xr 30 generated by the timing loop 24 is processed by the servo loop 28 in order to help compensate for a vibration affecting the disk drive, thereby improving the performance of the servo loop 28.

In the embodiment of FIG. 2B, the timing signal Xr 30 may not directly represent the vibration affecting the disk drive but rather represents the vibration as it affects the timing signal Xr 30 in a closed loop system. Accordingly, in one embodiment the timing signal Xr 30 is filtered by the PCF 32 shown in FIG. 2B, where the PCF 32 comprises an inverse transfer function from a delta in a rotation velocity of the disk ($\Delta\omega$) due to a vibration affecting the disk drive to the timing signal Xr 30. That is, if Xr=$G_A\Delta\omega$ where $\Delta\omega$ represents the delta in the rotation velocity of the disk 16 caused by a vibration and $G_A$ represents the transfer function from $\Delta\omega$ to the timing signal Xr, then $\Delta\omega$ may be estimated based on Xr by multiplying Xr by $G_A^{-1}$ (inverse of $G_A$). In this manner, the filtered timing signal Xk at the output of the PCF 32 is a more direct representation of the vibration affecting the rotation velocity of the disk 16. In an embodiment described below, the PCF 32 reduces the complexity of an adaptive FIR filter used to generate feed-forward compensation in the servo loop 28 that compensates for the vibration affecting the disk drive.

Figure 3A:
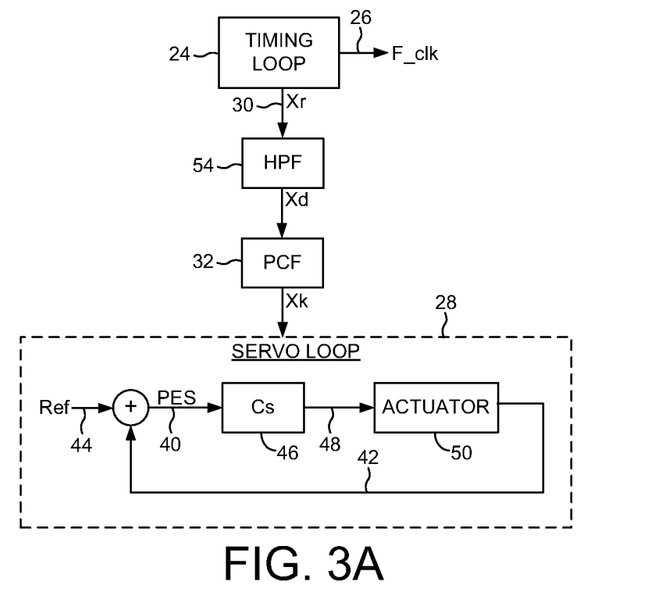
FIG. 3A shows an embodiment wherein low frequency noise in the timing signal is attenuated before being processed by the servo loop.

In one embodiment, the timing signal Xr 30 of the timing loop 24 shown in FIG. 2B may be affected by more than a vibration affecting the disk drive. For example, in one embodiment the timing signal Xr 30 may comprise low frequency noise due, for example, to imperfections in the spindle motor used to rotate the disk 16. In one embodiment, it may be desirable to attenuate the low frequency noise in the timing signal Xr 30 so that the filtered timing signal Xk better represents the vibration affecting the disk drive. An example of this embodiment is shown in FIG. 3A wherein a high-pass filter (HPF) 54 filters the timing signal Xr 30 so as to attenuate low frequency noise in the timing signal Xr 30. In the embodiment of FIG. 3A, the HPF 54 precedes the PCF 32; however, in another embodiment the HPF 54 may follow the PCF 32 since it is a linear system. The HPF 54 may attenuate noise in the timing signal Xr 30 within any suitable frequency range, such as a frequency range associated with noise induced by the spindle motor.

Figure 3B:
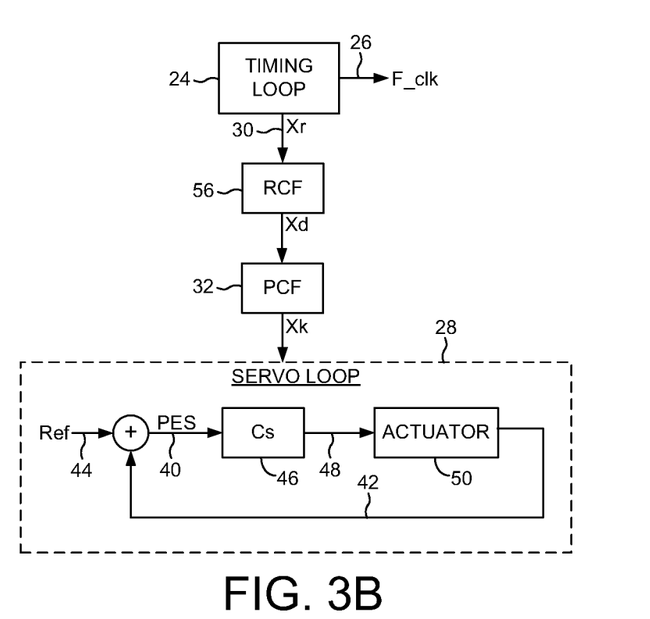
FIG. 3B shows an embodiment wherein a repeatable component (RC) of the timing signal is attenuated before being processed by the servo loop.

In one embodiment, the timing signal Xr 30 of the timing loop 24 shown in FIG. 2B may also comprise a repeatable component (RC) due to a disturbance other than the vibration affecting the disk drive. For example, the RC may be due to an eccentricity of the disk 16 due to a non-centric alignment of the disk 16 with the spindle motor, or due to a written-in error of the servo data (or other data) on the disk 16 used to synchronize the clock 26. In one embodiment, it may be desirable to attenuate a RC in the timing signal Xr 30 so that the filtered timing signal Xk better represents the vibration affecting the disk drive. An example of this embodiment is shown in FIG. 3B wherein a RC filter (RCF) 56 filters the timing signal Xr 30 so as to attenuate an RC in the timing signal Xr 30. In the embodiment of FIG. 3B, the RCF 56 precedes the PCF 32; however, in another embodiment the RCF 56 may follow the PCF 32 since it is a linear system.

Figure 4A:
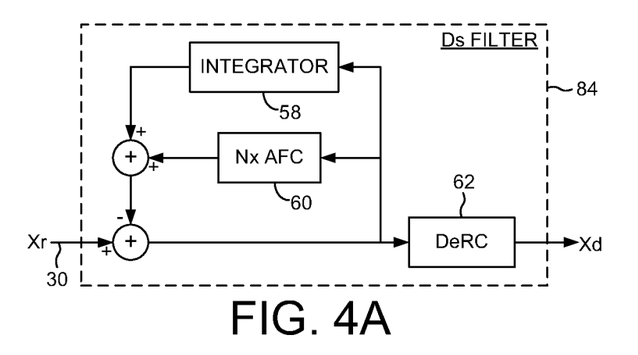
FIG. 4A shows an embodiment for attenuating the low frequency noise and the RC of the timing signal before being processed by the servo loop.
Figure 4B:
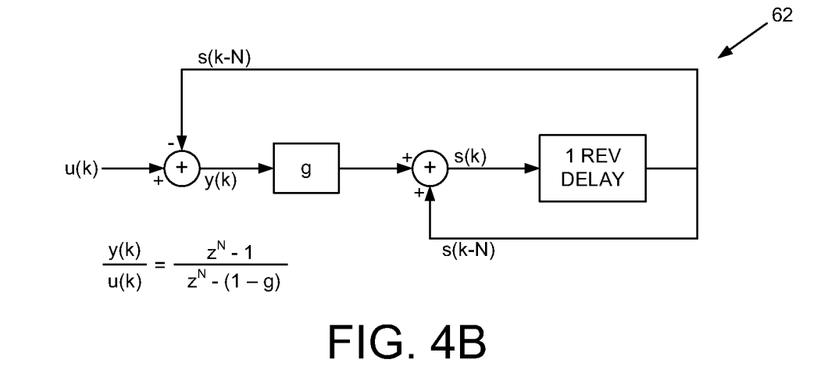
FIG. 4B shows an embodiment for attenuating the RC of the timing signal.

In one embodiment, the timing signal Xr 30 may be filtered by a combined HPF and RCF in order to attenuate both a low frequency noise and an RC in the timing signal Xr 30. FIG. 4A shows an example of this embodiment where an integrator 58 implements a HPF 54 for attenuating low frequency noise in the timing signal Xr 30. The control circuitry shown in FIG. 4A further comprises a Nx AFC filter 60 which attenuates at least the fundamental (1x disk rotation frequency) of the RC in the timing signal Xr 30 and optionally harmonics (Nx disk rotation frequency) of the RC in the timing signal Xr 30. In one embodiment, the Nx AFC filter comprises one or more sinusoids each having a particular magnitude and phase determined by adaptive coefficients. In one embodiment, the coefficients of the sinusoid(s) are adapted to reduce the amplitude of the timing signal Xr 30, thereby attenuating the RC in the timing signal Xr 30. The control circuitry in the embodiment of FIG. 4A further comprises a DeRC filter 62 which helps to further attenuate a residual RC in the timing signal Xr 30, wherein FIG. 4B shows an example embodiment for the DeRC filter 62 including the transfer function.

Figure 5:
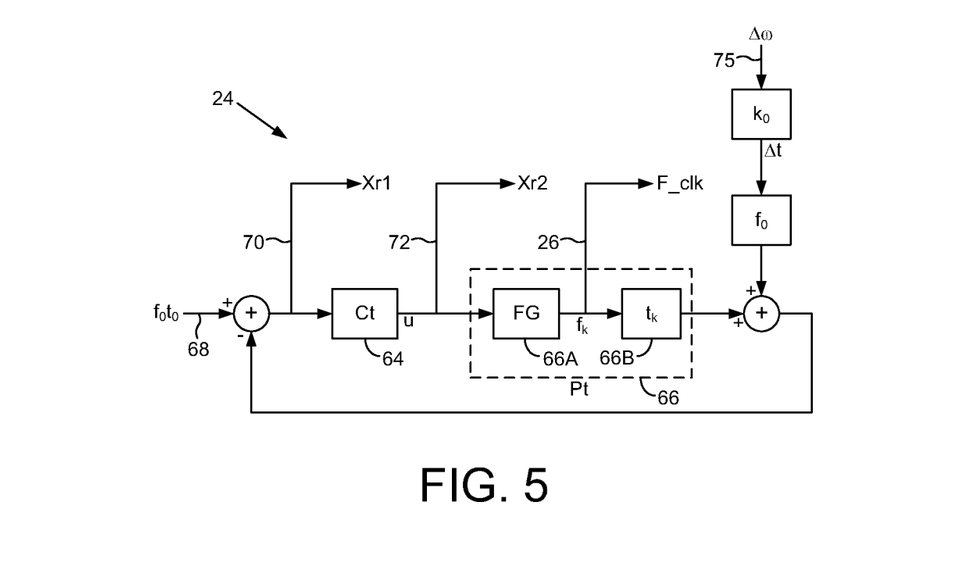
FIG. 5 shows a timing loop according to an embodiment wherein the timing signal may be selected from an input to a timing loop compensator or an output of the timing loop compensator.

FIG. 5 shows an example timing loop 24 according to an embodiment comprising a suitable compensator Ct 64 and a suitable plant Pt 66. The compensator Ct may implement any suitable compensation algorithm, including non-linear algorithms. Similarly any suitable plant Pt 66 may be employed, wherein in the embodiment of FIG. 5 the plant Pt 66 comprises a frequency generator 66A and counter 66B that counts a number of cycles at a frequency $f_k$ over an interval $t_k$ between data recorded on the disk (e.g., servo data). The number of cycles counted over the interval $t_k$ is subtracted from a target number of cycles of a base frequency $f_0$ counted over a target interval $t_0$ 68 to generate a timing error Xr1 70. The timing error Xr1 70 is filtered by the timing loop compensator Ct 64 to generate a timing control signal Xr2 72 applied to the frequency generator 66A so as to adjust the frequency $f_k$ until the number of cycles at the frequency $f_k$ counted over the interval $t_k$ equals the target number of cycles of the base frequency $f_0$ counted over the target interval $t_0$. In the embodiment of FIG. 5, a vibration induces a delta in the rotation velocity of the disk 16 $\Delta\omega$ 75 which induces a timing jitter $\Delta t$ into the timing loop 24 (where $k_0$ represents a ratio of $\Delta\omega$ to the timing error). This timing jitter $\Delta t$ affects a timing signal in the timing loop 24 such as the timing error Xr1 70 or the timing control signal Xr2 72.

When the timing signal Xr 30 output by the timing loop 24 in the embodiment of FIG. 2B comprises the timing error Xr1 70 of FIG. 5, the inverse transfer function $G_A^{-1}$ from $\Delta\omega$ 75 to the timing signal comprises:

$$(1+P_tC_t)\cdot k$$

where $P_t$ represents a transfer function of the frequency generator 66A of the timing loop, $C_t$ represents a transfer function of the compensator 64 of the timing loop 24, and k is a constant (e.g., in the embodiment shown in FIG. 5 k=$1/k_0f_0$). When the timing signal Xr 30 output by the timing loop 24 in the embodiment of FIG. 2B comprises the timing control signal Xr2 72 of FIG. 5, the inverse transfer function $G_A^{-1}$ from $\Delta\omega$ 75 to the timing signal comprises:

$$(1+P_tC_t)\cdot k/C_t$$

Accordingly, in one embodiment the PCF 32 of FIG. 2B comprises the appropriate transfer function such as described above depending on which timing signal Xr 30 in the timing loop 24 is evaluated (where any suitable timing signal may be evaluated).

Figure 6:
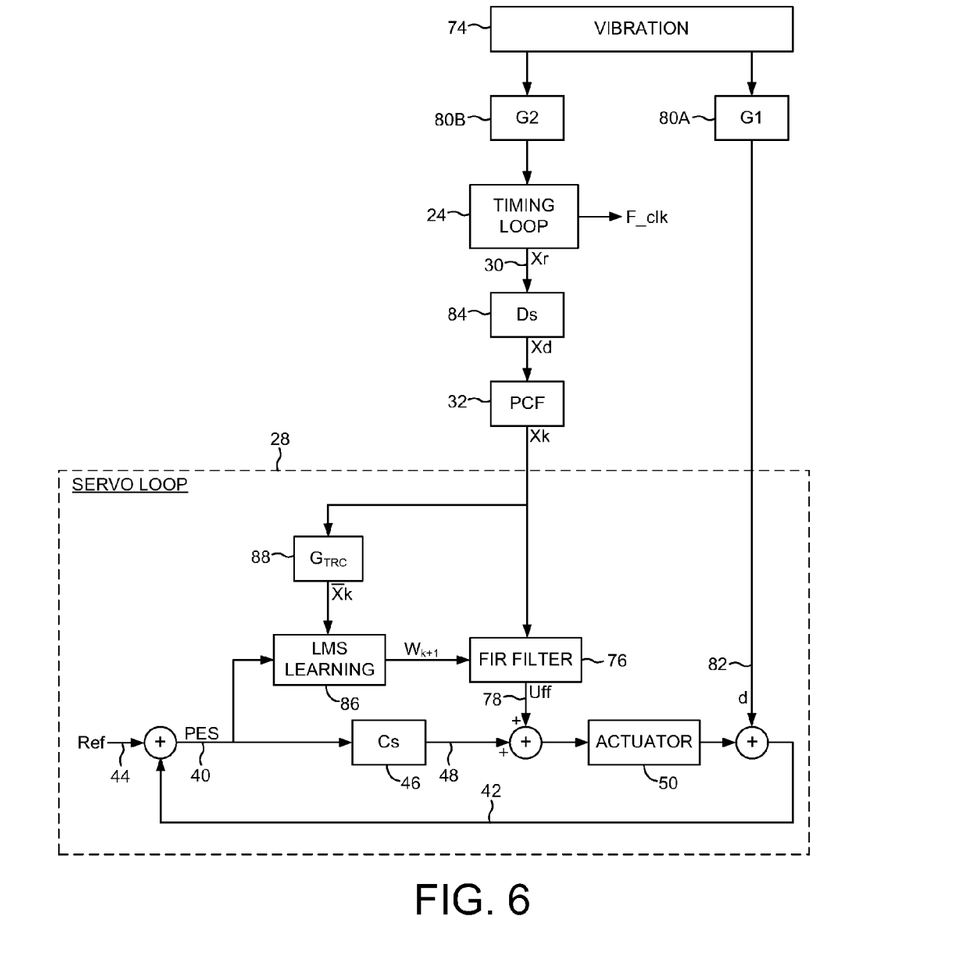
FIG. 6 shows an embodiment where the servo loop comprises an adaptive finite impulse response (FIR) filter for generating feed-forward compensation based on the filtered timing signal.

The filtered timing signal Xk of FIG. 2B may be processed by the servo loop 28 in any suitable manner to compensate for a vibration affecting the disk drive. FIG. 6 shows an embodiment wherein the filtered timing signal Xk is filtered by an adaptive FIR filter 76 in order to generate feed-forward compensation 78 that compensates for a vibration 74 affecting the disk drive. The vibration 74 induces a disturbance d 82 into the servo loop 28, wherein the disturbance d 82 has an unknown transfer function G1 80A relative to the amplitude of the vibration 74. The vibration 74 also affects the timing loop 24 (relative to a transfer function G2 80B) which manifests in the timing signal Xr 30. The timing signal Xr 30 is filtered by a filter Ds 84 which may comprise a high-pass filter (HPF) and a repeatable component filter (RCF) such as described above with reference to FIG. 4A. The timing signal Xr 30 is further filtered by the pre-compensation filter (PCF) 32 in order to account for the transfer function of the timing loop from a delta in the rotation velocity of the disk ($\Delta\omega$) due to the vibration 74 affecting the disk drive to the timing signal Xr 30. The filtered timing signal Xk is filtered by the adaptive FIR filter 76 to generate the feed-forward compensation 78 that compensates for the vibration 74 (compensates for the disturbance d 82 affecting the servo loop 28).

In one embodiment, the FIR filter 76 of FIG. 6 is adapted according to a Filtered-X Least Mean Square (LMS) algorithm 86 with attempts to minimize $E(e_k^2)$. With the adaptive FIR filter 76 having coefficients $W_k$, the LMS algorithm 86 may adapt the coefficients $W_k$ according to:

$$W_{k+1} = W_k + u\overline{X}_k e_k$$

where $\mu$ represents a learning coefficient, $\overline{X}_k$ represents the filtered timing signal Xk after being filtered by filter $G_{TRC}$ 88 (torque rejection curve of the servo loop 28), and $e_k$ represents a servo loop error signal (such as the PES 40). In one embodiment, using a PCF 32 to account for the timing loop transfer function from $\Delta\omega$ to the timing signal Xr 30 helps reduce the complexity of the adaptive FIR filter 76 by reducing the number of coefficients $W_k$ as well as reducing the computation time of the LMS algorithm 86 to update the coefficients $W_k$. In other words, without a PCF 32 the transfer function of the FIR filter 76 would need to include the transfer function of the PCF 32, thereby increasing the complexity as well as the adaptive computation time. In one embodiment, adapting the FIR filter 76 compensates for an error in computing or measuring the transfer function of the PCF 32.

Although the embodiment of FIG. 6 shows a Ds filter 84 separate from the PCF 32, in another embodiment the transfer functions of these filters may be combined into a single filter. In other words, in addition to an inverse transfer function from a delta in a rotation velocity of the disk ($\Delta\omega$) due to a vibration affecting the disk drive to the timing signal, the PCF 32 may also comprise other transfer functions such as a band-pass filter (BPF) transfer function and/or a high-pass filter (HPF) transfer function. In addition, in the embodiment of FIG. 6 the feed-forward compensation generates a torque (acceleration) control signal applied to the actuator 50. Assuming the vibration 74 causes an unknown acceleration of the disk, there is a resulting delta in the rotation velocity of the disk $\Delta\omega$75 (FIG. 5) that can be estimated from the timing signal generated by the timing loop. Therefore in one embodiment the PCF 32 may comprise a differentiator in order to transform the timing signal Xr 30 from a velocity to an acceleration. That is, in one embodiment the PCF 32 may comprise a transfer function $G_A^{-1}G_2^{-1}$, where $G_2$ represents a transfer function from acceleration to velocity.

The inverse transfer function $G_A^{-1}$ of the PCF 32 as well as the transfer function for $G_2$ may be determined in any suitable manner. In one embodiment, the inverse transfer function $G_A^{-1}$ and/or the transfer function $G_2$ may be determined theoretically based on known or estimated parameters of the timing loop 24. In another embodiment, the inverse transfer function $G_A^{-1}$ and/or the transfer function $G_2$ may be determined experimentally using a system identification method, for example, by monitoring the input to the PCF 32 relative to the effect on the PES 40 and then computing a corresponding transfer function that represents $G_A^{-1}$.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A disk drive comprising:
   a disk;
   a head;
   an actuator; and
   control circuitry comprising a timing loop configured to generate a clock synchronized to a rotation of the disk and a servo loop configured to control the actuator to actuate the head over the disk, the control circuitry configured to:
   filter a timing signal generated by the timing loop with a pre-compensation filter (PCF) comprising an inverse transfer function from a delta in a rotation velocity of the disk ($\Delta\omega$) due to a vibration affecting the disk drive to the timing signal; and
   control the actuator to actuate the head over the disk based on an output of the PCF.

2. The disk drive as recited in claim 1, wherein the control circuitry is further configured to:
   attenuate low frequency noise in the timing signal; and
   control the actuator to actuate the head over the disk based on the noise attenuated timing signal.

3. The disk drive as recited in claim 1, wherein the control circuitry is further configured to:
   attenuate a repeatable component (RC) of the timing signal; and
   control the actuator to actuate the head over the disk based on the RC attenuated timing signal.

4. The disk drive as recited in claim 1, wherein:
   the timing signal comprises a timing error; and
   the inverse transfer function comprises:

$$(1+P_t C_t) \cdot k$$

where:
   $P_t$ represents a transfer function of a frequency generator of the timing loop;
   $C_t$ represents a transfer function of a compensator of the timing loop; and
   k is a constant.

5. The disk drive as recited in claim 4, wherein the constant k comprises $$1/k_0 f_0$$

where:
   $k_0$ represents a ratio of $\Delta\omega$ to the timing error; and
   $f_0$ represents a base frequency of the frequency generator.

6. The disk drive as recited in claim 1, wherein:
   the timing signal comprises a timing control signal output by a compensator of the timing loop; and
   the inverse transfer function comprises:

$$(1+P_t C_t) \cdot k/C_t$$

where:
   $P_t$ represents a transfer function of a frequency generator of the timing loop;
   $C_t$ represents a transfer function of the compensator of the timing loop; and
   k is a constant.

7. The disk drive as recited in claim 6, wherein the constant k comprises $$1/k_0 f_0$$

where:
   $k_0$ represents a ratio of $\Delta\omega$ to a timing error; and
   $f_0$ represents a base frequency of the frequency generator.

8. A method of operating a disk drive, the method comprising:
   filtering a timing signal generated by a timing loop with a pre-compensation filter (PCF) comprising an inverse transfer function from a delta in a rotation velocity of a disk ($\Delta\omega$) due to a vibration affecting the disk drive to the timing signal; and
   controlling an actuator using a servo loop to actuate a head over the disk based on an output of the PCF.

9. The method as recited in claim 8, further comprising:
   attenuating low frequency noise in the timing signal; and
   controlling the actuator to actuate the head over the disk based on the noise attenuated timing signal.

10. The method as recited in claim 8, further comprising:
    attenuating a repeatable component (RC) of the timing signal; and
    controlling the actuator to actuate the head over the disk based on the RC attenuated timing signal.

11. The method as recited in claim 8, wherein:
    the timing signal comprises a timing error; and
    the inverse transfer function comprises:

$$(1+P_t C_t) \cdot k$$

where:
    $P_t$ represents a transfer function of a frequency generator of the timing loop;
    $C_t$ represents a transfer function of a compensator of the timing loop; and
    k is a constant.

12. The method as recited in claim 11, wherein the constant k comprises $$1/k_0 f_0$$

where:
    $k_0$ represents a ratio of $\Delta\omega$ to the timing error; and
    $f_0$ represents a base frequency of the frequency generator.

13. The method as recited in claim 8, wherein:
    the timing signal comprises a timing control signal output by a compensator of the timing loop; and
    the inverse transfer function comprises:

$$(1+P_t C_t) \cdot k/C_t$$

where:
    $P_t$ represents a transfer function of a frequency generator of the timing loop;
    $C_t$ represents a transfer function of the compensator of the timing loop; and
    k is a constant.

14. The method as recited in claim 13, wherein the constant k comprises $$1/k_0 f_0$$

where:
    $k_0$ represents a ratio of $\Delta\omega$ to a timing error; and
    $f_0$ represents a base frequency of the frequency generator.

15. Control circuitry comprising:
    a timing loop configured to generate a clock synchronized to a rotation of a disk of a disk drive that comprises a head and an actuator; and
    a servo loop configured to control the actuator to actuate the head over the disk,
    wherein the control circuitry configured to:
    filter a timing signal generated by the timing loop with a pre-compensation filter (PCF) comprising an inverse transfer function from a delta in a rotation velocity of the disk ($\Delta\omega$) due to a vibration affecting the disk drive to the timing signal; and control the actuator to actuate the head over the disk based on an output of the PCF.

16. The control circuitry as recited in claim 15, wherein the control circuitry is further configured to:
  attenuate low frequency noise in the timing signal; and
  control the actuator to actuate the head over the disk based on the noise attenuated timing signal.

17. The control circuitry as recited in claim 15, wherein the control circuitry is further configured to:
  attenuate a repeatable component (RC) of the timing signal; and
  control the actuator to actuate the head over the disk based on the RC attenuated timing signal.

18. The control circuitry as recited in claim 15, wherein:
  the timing signal comprises a timing error; and
  the inverse transfer function comprises:

$$(1+P_t C_t) \cdot k$$

where:
    $P_t$ represents a transfer function of a frequency generator of the timing loop;
    $C_t$ represents a transfer function of a compensator of the timing loop; and
    k is a constant.

19. The control circuitry as recited in claim 18, wherein the constant k comprises $$1/k_0 f_0$$

where:
    $k_0$ represents a ratio of $\Delta\omega$ to the timing error; and
    $f_0$ represents a base frequency of the frequency generator.

20. The control circuitry as recited in claim 15, wherein:
  the timing signal comprises a timing control signal output by a compensator of the timing loop; and
  the inverse transfer function comprises:

$$(1+P_t C_t) \cdot k/C_t$$

where:
    $P_t$ represents a transfer function of a frequency generator of the timing loop;
    $C_t$ represents a transfer function of the compensator of the timing loop; and
    k is a constant.

21. The control circuitry as recited in claim 20, wherein the constant k comprises $$1/k_0 f_0$$

where:
    $k_0$ represents a ratio of $\Delta\omega$ to a timing error; and
    $f_0$ represents a base frequency of the frequency generator.

* * * * *